United States Patent

[11] 3,579,995

[72] Inventor John F. Flynn
 358 Strawberry Hill Road, Concord, Mass. 01742
[21] Appl. No. 831,881
[22] Filed June 10, 1969
[45] Patented May 25, 1971

[54] VENTED LEACHING CHANNEL
 3 Claims, 5 Drawing Figs.
[52] U.S. Cl.................................................. 61/13, 210/532
[51] Int. Cl..................................................... E02b 13/00
[50] Field of Search............................................ 61/13, 12, 11, 10; 210/532 S, 170, 256

[56] References Cited
UNITED STATES PATENTS

| | | | |
|---|---|---|---|
| 2,767,801 | 10/1956 | Eads............................. | 61/11X |
| 2,795,542 | 6/1957 | Horne et al..................... | 61/13X |
| 3,097,166 | 7/1963 | Monson......................... | 210/532X |
| 3,451,553 | 6/1969 | Davis............................. | 210/532X |

FOREIGN PATENTS

| | | | |
|---|---|---|---|
| 511,677 | 1939 | Great Britain................ | 61/11 |
| 956,046 | 1964 | Great Britain................ | 61/13 |

Primary Examiner—Jacob Shapiro
Attorney—Russell and Nields

ABSTRACT: This invention relates to sewage systems, FIG. 3, it particular to a vented leaching channel for use in such systems. A plurality of vented leaching channels are arranged in a corresponding plurality of trenches in the leaching field of a sewage system so as to control the flow of sewage and to form a volume underground for storage output during aerobic action thereon. Each leaching channel comprises a series of leaching channel units arranged end-to-end, the first unit having an end cover adapted to receive the sewage and the last unit having a vent. Except for the end cover and vent, the units are identical for ease of manufacture and installation, and each includes a barn or shedlike structure having sheltered apertures in its walls adapted to permit outward flow of sewage while preventing inward flow of dirt and other undesirable material. Special access apertures are also provided in all the units.

PATENTED MAY 25 1971 3,579,995

INVENTOR.
JOHN F. FLYNN
BY
Russell & Nields 3,579,995

1

VENTED LEACHING CHANNEL

BACKGROUND OF THE INVENTION

1. Field of the Invention

The invention relates to sewage systems, and in particular to leaching fields in such systems.

BACKGROUND OF THE INVENTION

2. Prior Art

Leaching fields are a well-known component of sewage systems. Such fields have generally included a series of trenches filled with crushed stone to which and throughout which sewage distributed for decomposition by aerobic or bacterial action.

The sewage is delivered to the crushed stone in each trench by means of a pipe extending along it and having perforations in its walls. The sewage is introduced at one end of the pipe and issues therefrom through the perforations into the crushed rock.

One of the problems with this arrangement is the fact that slime and other solid matter becomes lodged in the interstices of the rocks, so that eventually the entire trench becomes clogged and no longer usable, and the entire contents of the trench has to be replaced.

A recent proposed alternative to this arrangement eliminates the trenches altogether so that the leaching field is essentially a flat surface of extended area upon which are positioned a number of chambers which constitute a support for the ground fill above the leaching field. Such an arrangement is disclosed in U.S. Pat. No. 3,339,366 to Gogan and Joly. HOwever, the usefulness of such an arrangement is essentially limited to clay-type areas where it is primarily evaporation that is relied on in the sewage disposal action. Moreover, such an arrangement does not have very satisfactory means for preventing seepage of sand into the interior of the chamber array. Such seepage prevention is relatively unimportant in the clay-type areas for which this arrangement is designed, but can be an important factor in prolonging the life of a leaching field in other types of soil.

SUMMARY

The invention preserves the trench-type of construction in the design of its leaching field, but eliminates the need for either crushed stone or a perforated pipe by providing a vented leaching channel whose lateral dimensions match those of the trench so as to convert the trench into a channel for sewage from which the sewage may seep directly into the surrounding ground without the need for retention in crushed rock. Each channel unit comprises a barn or shedlike unit having perforations in its walls for issuance of the sewage. These perforations are sheltered so as to prevent influx of sand or other undesirable material. Vents are provided, together with access apertures for cleaning and renewing the trench surfaces from time to time.

BRIEF DESCRIPTION OF THE DRAWINGS

The invention may best be understood from the following detailed description thereof having reference to the accompanying drawings in which.

DETAILED DESCRIPTION OF THE INVENTION

Figure 1:
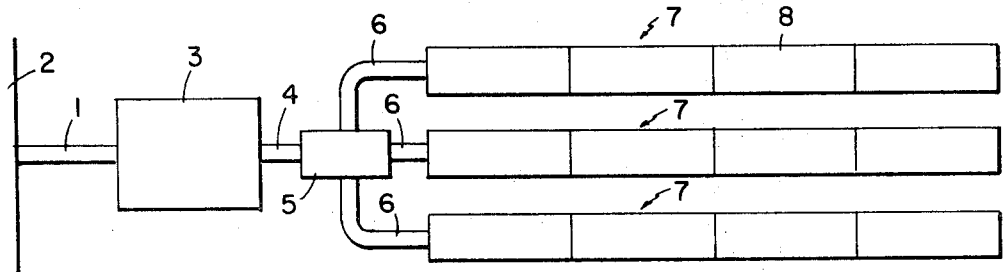
FIG. 1 is a top view of a typical sewage system with vented leaching channels constructed in accordance with the invention, each vented leaching channel comprising a series of leaching channel units.
Figure 2:
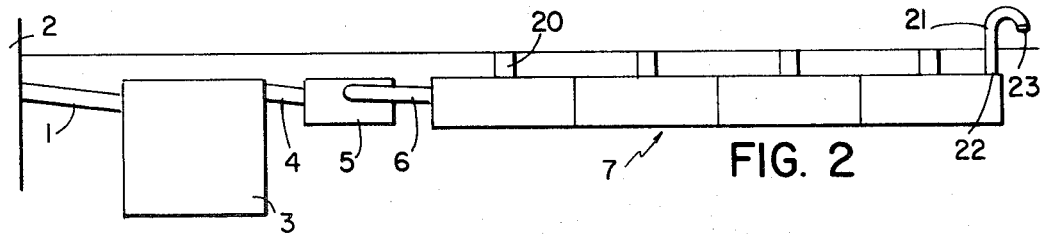
FIG. 2 is a side view of the sewage system shown in FIG. 1.

Referring to the drawings and first to FIGS. 1 and 2 thereof, in a typical sewage system sewage flows through a sewer pipe 1 from a dwelling 2 to a septic tank 3 where the sewage is initially stored and bacterial action takes place. Solid matter remains in the septic tank 3 to be subjected to continuing bacterial action resulting in decomposition and the liquid portion passes out through a sewer pipe 4. The pitch of both sewer pipes 1 and 4 is usually about one-fourth inch per foot. The liquid portion of the sewage continues through the sewer pipe 4 from the septic tank 3 into a distribution box 5 from which connecting pipes 6 conduct the liquid sewage to leaching channels 7. The connecting pipes 6 from the distribution box 5 may be for example solid 4-inch orangeberg pipe. In a representative sewage system as shown in FIGS. 1 and 2, the leaching field may include for example three leaching channels 7 and in accordance with the invention, each of the leaching channels comprises a sequence of leaching channel units 8 constructed in accordance with the invention and described in greater detail hereinafter. Each leaching channel 7 is positioned in a corresponding trench 9.

Figure 4:
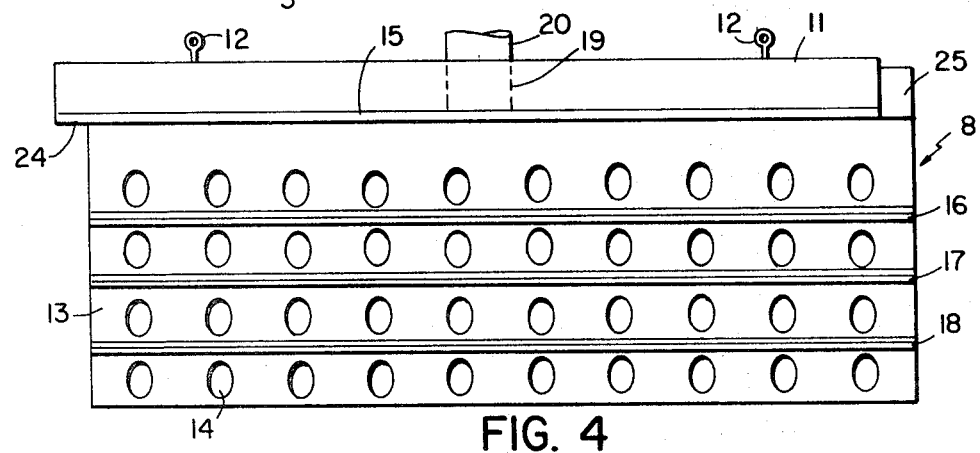
FIG. 4 is a side view of the leaching channel unit of FIG. 3.
Figure 3:
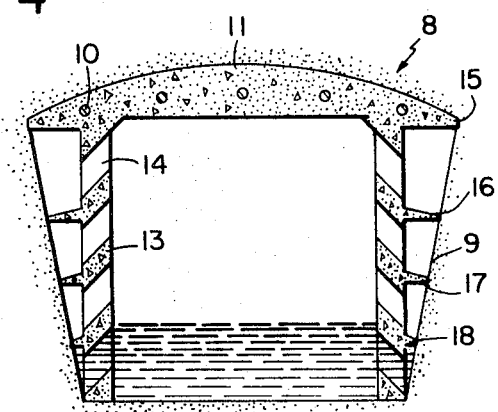
FIG. 3 is a vertical section taken through one of the leaching channel units of FIGS. 1 and 2.

Referring now to FIGS. 3 and 4, a representative leaching channel unit 8 constructed in accordance with the invention consists of a barn or shedlike member constructed of concrete, reinforced by electrically welded No. 7 reenforcing bars 10 (having a ⅞-inch diameter), using 10-inch by 10-inch mesh. A typical channel unit might be 4 feet high by 4 feet wide by 10 feet long having a ceiling 11 in the shape of a 10-inch-thick crown and capable of supporting a 5,000 lb/in$^2$ load. The crown shape of the ceiling 11 assists in supporting the weight of the soil on top thereof. A smaller channel unit might be 1 foot high by 2 feet wide by 10 feet long, having 3-inch apertures in its walls. The ceiling of such a unit might not require a crown shape, and the thickness of the ceiling might be the same as that of the walls described hereinafter. Such a unit would have No. 4 reenforcing bars (having a four-eighth 4 diameter), electrically welded in a 10-inch by 10-inch mesh. However, such a unit would be capable of supporting only 3,000 lb/in$^2$. Another representative channel unit might be 18 inches high by 30 inches or perhaps 36 inches wide with the usual 10-inch length, and having 4-inch apertures in its walls. The ceiling of such a unit could have the shape of a 6-inch-thick crown, and such a unit could have No. 6 reenforcing bars (having a sixth-eighth inch diameter) electrically welded in a 10-inch by 10-inch mesh, being thus capable of bearing a load of 3700 lbs/in$^2$.

Two hooking eyes 12 are located in the ceiling 11 of each unit. The hooking eyes 12 are used in lowering the channel unit 8 into the trench 9 during installation, or in removing the channel unit 8 from the trench 9 during renovation.

In accordance with the invention, the sidewalls 13 are provided with 4-inch diameter apertures 14 having round cross section but placed at an angle to the vertical walls 13. This angle should be such that a horizontal line cannot pass through the aperture, and a preferred angle is 45°. The thickness of the walls 13 for example may be 3 inches.

Each channel unit 8 has at least one lip 15 extending the length of the unit on each side thereof above the top row of apertures 14. In addition to the lip 15 at the top of each wall 13 of the unit, there may be other lips 16, 17, 18 parallel thereto, supported on the outside of the walls 13 and extending the length of the unit, and arranged above successive horizontal rows of apertures 14. These auxiliary lips 16, 17, 18 extend outward from the wall 13 a distance sufficient to reach the sides of the trench 9 so that the width of each lip becomes progressively smaller in the series from the top of the unit to the bottom. The unit thus fits in the trench 9 as shown. The trench walls are at a slight angle to the vertical, and the lips on the channel unit are designed to conform to the shape of the trench. With an arrangement of this type, no stone is needed in the trench to assist in leaching or to hold the banking of the trench.

The lips preferably have a cross section in the shape of a right triangle so arranged that the hypotenuse of the triangle slopes downward away from the outer surface of the wall, with one of the other sides flush against the outer surface of the wall and the other side extending outward from the wall horizontally and just above a row of apertures. The horizontal lower surface of the lip thus shields the row of apertures below the lip, while the sloping upper surface of the lip assists in keeping dirt and other undesirable material away from the next higher row of apertures (except, of course, in the case of the uppermost lip).

Each unit is also provided with a pumping and inspection aperture 19, which should be at least 8 inches in diameter for pumping purposes, located in the center of the length of the unit, into which a suitable pipe 20 is inserted leading to finished grade and provided with an airtight cover (not shown).

Each vent may comprise a 4-inch cast iron pipe 21 extending upward through an aperture 22 in the ceiling 11 of the channel unit 8 in each series which is farthest from the distribution box 5, and thence to above grade level, where a semicircular bend occurs in the pipe so that the upper end thereof faces downward. The deodorizer may comprise a carbon filter 23 positioned just inside the upper end of the pipe 21. The channel units are connected end-to-end by 2-inch ship lap joints, a projection 24 from one unit resting on top of an indentation 25 in the adjacent unit. These ship lap joints assist in sheltering the interior of the leaching channel.

Figure 5:
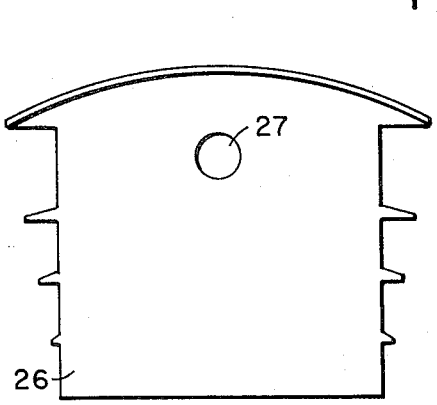
FIG. 5 is an end view of one of the leaching channel units shown in FIGS. 1 and 2.

Referring now to FIG. 5 therein is shown the end cover 26 at that end of each of the channels which is nearest the distribution box 5. The end cover is provided with an aperture 27 for the connecting pipe 6 from the distribution box 5.

Having thus described the principles of the invention, together with several illustrative embodiments thereof, it is to be understood that, although specific teams are employed, they are used in a generic and descriptive sense, and not for purposes of limitation, the scope of the invention being set forth in the following claims.

I claim:

1. A vented leaching channel for use in sewage systems, comprising a series of channel units, each unit comprising a barn or shedlike structure having sheltered apertures in its walls adapted to permit outward flow of sewage while preventing inward flow of dirt and other undesirable material, wherein said apertures are arranged in a plurality of vertically spaced horizontal rows and wherein the shelter for said apertures comprises a corresponding plurality of outer lips extending the length of the unit, the width of any lip being less than that of all higher lips and greater than that of all lower lips.

2. A leaching field comprising a plurality of trenches, a distribution box, a series of channel units in each trench, each channel unit comprising a pair of apertured walls and an unapertured ceiling connecting said walls and sheltering the volume between said walls, connectors between the ceilings of adjacent channel units, said connectors sheltering the volume below them, an end wall at that end of each series which is the more remote from said distribution box, an inlet wall at the other end of each series, said inlet wall including an aperture adapted to receive effluent from the distribution box, and a vent near said end wall, wherein the apertures in said apertured walls are arranged in a plurality of horizontal rows and wherein the shelter for said apertures comprises a corresponding plurality of outer lips extending the length of the unit, the width of any lip being less than that of all higher lips and greater than that of all lower lips.

3. A vented leaching channel for use in sewage systems, comprising a series of channel units, each unit comprising a barn or shedlike structure having apertures in its walls arranged in a plurality of vertically spaced horizontal rows and adapted to permit outward flow of sewage while preventing inward flow of dirt and other undesirable material, said apertures extending outward through the thickness of said walls at a downwardly sloping angle such that a horizontal line cannot pass through the aperture in the thickness of said walls.